Patented Dec. 2, 1941

2,264,291

UNITED STATES PATENT OFFICE 2,264,291

VINYLIDENE CHLORIDE COMPOSITION STABLE TO LIGHT

Raymond F. Boyer, Lorne A. Matheson, and Clarence L. Moyle, Midland, Mich., assignors to The Dow Chemical Company, Midland, Mich., a corporation of Michigan No Drawing. Application September 19, 1940, Serial No. 357,404

7 Claims. (Cl. 260—30)

The present invention relates to compositions comprising polymeric vinylidene chloride products and certain light stabilizers therefor.

The polymers of vinylidene chloride alone, its co-polymers with other polymerizable materials, various plasticized compositions thereof, and certain ways in which they may be made are described in U. S. Patents Nos. 2,160,903-4 and 2,160,931-948. The polymers of vinylidene chloride alone and its co-polymers and plasticized compositions are herein referred to as "polymeric vinylidene chloride products." These products, or most of them, are capable of being molded to form useful articles under the combined effects of heat and pressure. Some of them exhibit sufficient solubility in certain solvents, more particularly at elevated temperatures, to permit their being cast as films. In most cases, the articles produced either by molding, extrusion, or by casting from solution of polymeric vinylidene chloride products are subject to decomposition when exposed for prolonged periods to the effects of light. This appears to be particularly true of articles having thin cross section, especially when they are subjected to the effects of ultraviolet light. This apparent shortcoming of articles produced from polymeric vinylidene chloride products makes it highly desirable to obtain stabilizers for these products which will prevent or at least minimize the darkening effect heretofore observed when the products have been exposed to light.

It is accordingly among the objects of the present invention to provide a polymeric vinylidene chloride product stabilized against the darkening and embrittling effects of light. Another object is to provide a composition comprising a polymeric vinylidene chloride product and a light stabilizer therefor. Particular objects will appear hereinafter.

It has now been found that the foregoing and related objects may be attained through the incorporation in a polymeric vinylidene chloride product of particular dihydroxy-benzophenones. More specifically, it has been found that 2.2'-dihydroxy-benzophenone and to a somewhat lesser extent 2.4'-dihydroxy-benzophenone are excellent stabilizers for polymeric vinylidene chloride products. The dihydroxy-benzophenone compounds may be incorporated in the polymeric vinylidene chloride product in amounts which generally vary in the range from about 0.5 to about 10 per cent based on the weight of the said polymers or co-polymers. As much as 40 per cent of 2.2'-dihydroxy-benzophenone has been added and found to stabilize the polymer, but this amount is not needed. For most purposes, it has been found that from 1 to 5 per cent of the dihydroxy-benzophenone compound is sufficient to effect the desired stabilizing action against light.

The dihydroxy-benzophenone compound may be added to the polymeric product in various ways. For example, if the polymer or co-polymer is capable of being dispersed or dissolved in an organic solvent, the stabilizer may be added to the said solution and the stabilized polymeric product obtained from the solution in the desired form. Alternatively, the polymeric product may be masticated with the stabilizer, which may suitably be dissolved in a small amount of solvent, on compounding rolls in the methods well known to the art.

Regardless of the manner in which the herein concerned stabilizers are added to the polymeric products, it has been found that they exhibit a remarkable stabilizing effect on the polymeric material when the latter is exposed to light. Thus, an untreated film or filament of a vinylidene chloride product may assume a dark brown or black coloration after exposure to sunlight. By way of contrast, the composition containing relatively small amounts of a preferred dihydroxy-benzophenone when exposed to sunlight in like manner and in the same physical state will resist discoloration for periods up to several months, or longer.

The following example illustrates the practice of the present invention:

A 20 per cent solution in dioxane of the co-polymer of vinylidene chloride with about 8 per cent of ethyl acrylate was treated with 3 per cent, based on the weight of co-polymer present, of each of the dihydroxy-benzophenones listed in the following table. From the so-formed solution of co-polymer and stabilizing agents films 0.003 inch thick were cast on clear glass plates and were then exposed in the fadeometer for 70 hours. An observation was made of the per cent of the available visible light which was transmitted through the samples both before and after exposure. This factor gives an indication of the amount of darkening on exposure to light.

Table

| Added agent | Percent visible transmission | |
|---|---|---|
| | Before | After 70 hours |
| 2.2'-dihydroxy-benzophenone | 90 | 90 |
| 2.4'-dihydroxy-benzophenone | 91 | 85 |
| 2.5-dihydroxy-benzophenone | 90 | 72 |
| 4.4'-dihydroxy-benzophenone | 92 | 42 |
| Blank | 87 | 74 |

It is observed that the 2.2'- and 2.4'-dihydroxy-benzophenones each effect a substantial stabilization of the tested co-polymer, the 2.2'-dihydroxy-benzophenone causing the composition to show no change in the transmission of visible light while 2.4'-dihydroxy-benzophenone permits a 6 per cent drop in the amount of light transmitted in this test, as compared with 13 per cent for the blank. The 2.5- and 4.4'-dihydroxy-benzophenone compounds gave compositions which were no better than the blank.

The stabilizing effect of the preferred compounds herein disclosed can be observed when molded or extruded articles made of polymeric vinylidene chloride products are superficially coated with a vinylidene chloride co-polymer lacquer containing stabilizing agents.

The invention has been illustrated with particular reference to the co-polymer of vinylidene chloride and ethyl acrylate. It is to be understood that the invention is not limited to its use in connection with this co-polymer but that it may be applied equally as effectively to other co-polymers of vinylidene chloride such as those with vinyl chloride, vinyl acetate, styrene, methyl methacrylate, and the like. In its practical application, the invention appears to be limited only by the requirement that the polymeric vinylidene chloride product to be treated is one which, without a light stabilizing agent, shows evidence of decomposition when exposed to light.

In addition to the light stabilizing effect of the particular dihydroxybenzophenones, these compounds also exhibit a certain amount of stabilizing action against the effects of heat, when incorporated in polymeric vinylidene chloride products, and, further, they display some plasticizing effect on the compositions.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A composition of matter comprising a polymeric vinylidene chloride product, and, as a stabilizing agent therefor, a compound selected from the group consisting of 2.2'-dihydroxy-benzophenone and 2.4'-dihydroxy-benzophenone.

2. A composition of matter comprising a polymeric vinylidene chloride product, and, as a stabilizing agent therefor, from about 0.5 to about 10 per cent, based on the weight of the said polymeric product of a compound selected from the group consisting of 2.2'-dihydroxy-benzophenone and 2.4'-dihydroxy-benzophenone.

3. A composition of matter comprising a polymeric vinylidene chloride product, and, as a stabilizing agent therefor, from 1 to 5 per cent of a compound selected from the group consisting of 2.2'-dihydroxy-benzophenone and 2.4'-dihydroxy-benzophenone.

4. A composition of matter comprising a polymeric vinylidene chloride product, and, as a stabilizing agent therefor, 2.2'-dihydroxy-benzophenone.

5. A composition of matter comprising a polymeric vinylidene chloride product, and, as a stabilizing agent therefor, from about 0.5 to about 10 per cent, based on the weight of the polymeric product of 2.2'-dihydroxy-benzophenone.

6. A composition of matter comprising a polymeric vinylidene chloride product, and, as a stabilizing agent therefor, 2.4'-dihydroxy-benzophenone.

7. A composition of matter comprising a polymeric vinylidene chloride product, and, as a stabilizing agent therefor, from about 0.5 to about 10 per cent, based on the weight of the polymeric product of 2.4'-dihydroxy-benzophenone.

RAYMOND F. BOYER.
LORNE A. MATHESON.
CLARENCE L. MOYLE.